United States Patent
Kim et al.

(10) Patent No.: US 9,674,444 B2
(45) Date of Patent: Jun. 6, 2017

(54) APPARATUS AND METHOD FOR POSITIONING IMAGE AREA USING IMAGE SENSOR LOCATION

(71) Applicant: Samsung Electronics Co., Ltd., Suwon-si, Gyeonggi-do (KR)

(72) Inventors: Moonsoo Kim, Seoul (KR); Hongsuk Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/178,797

(22) Filed: Feb. 12, 2014

(65) Prior Publication Data

US 2014/0240543 A1    Aug. 28, 2014

(30) Foreign Application Priority Data

Feb. 26, 2013   (KR) .................. 10-2013-0020757

(51) Int. Cl.
*H04N 5/232*   (2006.01)
*H04N 5/225*   (2006.01)
*H04N 5/272*   (2006.01)

(52) U.S. Cl.
CPC ....... *H04N 5/23293* (2013.01); *H04N 5/2258* (2013.01); *H04N 5/272* (2013.01)

(58) Field of Classification Search
CPC ......... H04N 2007/145; H04N 13/0497; H04N 5/232; H04N 5/23258; H04N 5/23293; H04N 5/2621; H04N 5/2628; H04N 7/142; H04N 7/147; G06K 9/00228

USPC ............... 348/231.99, 262, 46, 208.4
See application file for complete search history.

(56) References Cited

U.S. PATENT DOCUMENTS

| | | | |
|---|---|---|---|
| 6,867,807 B2 * | 3/2005 | Malloy Desormeaux | ............ 348/333.13 |
| 2003/0117501 A1 | 6/2003 | Shirakawa | |
| 2006/0044396 A1 | 3/2006 | Miyashita et al. | |
| 2006/0240873 A1 | 10/2006 | You et al. | |
| 2009/0123037 A1 | 5/2009 | Ishida | |
| 2010/0164852 A1 | 7/2010 | Kim et al. | |
| 2010/0328431 A1 | 12/2010 | Kim et al. | |
| 2011/0249073 A1 * | 10/2011 | Cranfill et al. | ............ 348/14.02 |
| 2012/0268552 A1 * | 10/2012 | Choi | ..................... H04N 7/147 |
| | | | 348/14.07 |

(Continued)

FOREIGN PATENT DOCUMENTS

| | | |
|---|---|---|
| EP | 1560421 A1 | 8/2005 |
| JP | 9-107531 A | 4/1997 |
| JP | 11-225319 A | 8/1999 |

(Continued)

*Primary Examiner* — Padma Haliyur
(74) *Attorney, Agent, or Firm* — Jefferson IP Law, LLP

(57) ABSTRACT

An apparatus and a method for processing a plurality of images by using an electronic device are provided. The method includes displaying at least a portion of a first image obtained by a first image sensor functionally connected to the electronic device as a first preview image in a display functionally connected to the electronic device and displaying at least a portion of a second image obtained by a second image sensor functionally connected to the electronic device as a second preview image together with the first preview image in the display. An area of the display for displaying the second preview image corresponds at least to a location of the second image sensor in the display.

26 Claims, 10 Drawing Sheets

(56) References Cited

U.S. PATENT DOCUMENTS

2012/0274808 A1* 11/2012 Chong et al. ................ 348/234

FOREIGN PATENT DOCUMENTS

| KR | 10-2008-0063996 A | 7/2008 |
| KR | 10-2010-0077433 A | 7/2010 |
| KR | 10-2011-0001400 A | 1/2011 |
| KR | 10-2013-0010590 A | 1/2013 |

* cited by examiner

APPARATUS AND METHOD FOR POSITIONING IMAGE AREA USING IMAGE SENSOR LOCATION

CROSS-REFERENCE TO RELATED APPLICATION(S)

This application claims the benefit under 35 U.S.C. §119 (a) of a Korean patent application filed on Feb. 26, 2013 in the Korean Intellectual Property Office and assigned Serial number 10-2013-0020757, the entire disclosure of which is hereby incorporated by reference.

TECHNICAL FIELD

The present disclosure relates to an apparatus and a method for photographing a still or moving image by using a portable electronic device having a camera function. More particularly, the present disclosure relates to an apparatus and a method for photographing an image by using a plurality of image sensors in a portable electronic device.

BACKGROUND

Generally, a method for photographing with a camera device includes displaying image data obtained by each image sensor of the camera device, and storing the obtained image data in a memory by compressing and encoding if a user generates a control command for photographing.

Currently, camera devices and portable electronic devices having a camera function (for example, a mobile phone, a tablet, a computer, etc.) are equipped with a plurality of images sensors supporting a high or low resolution image. In this case, each of the plurality of image sensors is installed at the front or rear side of the device. The device having the plurality of image sensors can photograph a subject located at the front or rear side by independently selecting a front or rear image sensor. Namely, the electronic device can individually photograph different images by using the plurality of image sensors and individually store the photographed images.

A camera device having a plurality of image sensors obtains a plurality of images by driving at least one of the image sensors, and stores the obtained images by synthesizing a Picture In Picture (PIP) form. If the plurality of image sensors is driven at the same time, the device can display an image photographed by an image sensor in a main screen and images photographed by the remaining image sensors in a sub screen (PIP screen) in a preview mode. While executing the preview mode, the location of the sub screen may be fixed to a location in a screen of display unit. For example, in a device having a dual camera, the device may locate the images of the sub screen at the lower right side of the display unit in a preview mode, and store the main screen and the sub screen displayed at the lower right of the main screen by synthesizing in a photographing mode.

In the device having the plurality of image sensors (e.g., a dual camera), a subject of the front camera can be a photographer (i.e., the user), and the user may take a photograph by looking at the screen in a dual shot mode. In this case, the photographer's eyes are fixed to the screen, and the photographing direction of the front camera becomes different from the direction of the photographer's eye direction. Therefore, a photographed image may be unnatural looking due to the difference of directions.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for processing a plurality of images obtained by cameras in a device having a plurality of image sensors. For this, an apparatus according to various embodiments of the present disclosure displays a sub screen in a display unit adjacent to a camera in a preview mode, and stores a plurality of images by synthesizing the images of the sub screen in a location of a main screen.

In accordance with an aspect of the present disclosure, a method for processing an image using an electronic device is provided. The method includes displaying at least a portion of a first image obtained by a first image sensor functionally connected to the electronic device as a first preview image in a display functionally connected to the electronic device, and displaying at least a portion of a second image obtained by a second image sensor functionally connected to the electronic device as a second preview image together with the first preview image in the display. Here, an area of the display for displaying the second preview image may correspond at least to a location of the second image sensor in the display.

In accordance with another aspect of the present disclosure, an electronic device is provided. The electronic device includes a first image sensor configured to obtain a first image corresponding to at least a portion of a first surface of the electronic device, a second image sensor configured to obtain a second image corresponding to at least a portion of a second surface of the electronic device, and a control unit configured to display at least a portion of the first image as a first preview image in a display functionally connected to the electronic device and to display at least a portion of the second image as a second preview image together with the first preview image in the display. Here an area of the display for displaying the second preview image may correspond at least to a location of the second image sensor in the display According to various embodiments of the present disclosure, an image processing unit is configured with a plurality of cameras. When previewing and photographing a plurality of images in a main screen and sub screen by driving the plurality of camera at the same time, a sub screen display area of a capture position is set to a location adjacent to a camera photographing a sub screen image in a preview mode, and the sub screen image in the capture position is synthesized in a location of the sub screen display area if a photographing is requested. If the plurality of images is photographed like this, a difference between a user's eye direction and a photographing angle of the camera can be minimized, and a dislocation of the user's eye direction can be reduced. Therefore, the sub screen image being synthesized in the main screen image may have a more natural posture.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
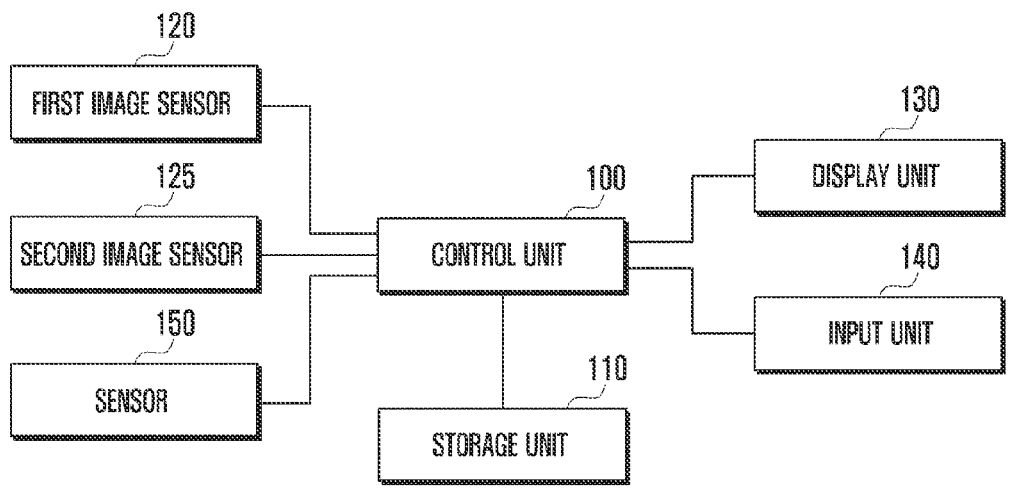
FIG. 1 is a block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A camera device or a portable terminal according to an embodiment of the present disclosure is equipped with a plurality of image sensors, and can display a plurality of images obtained by the plurality of image sensors in a screen including a main screen and a sub screen while driving the plurality of image sensors. When displaying a preview image, the device sets a sub screen display area adjacent to an image sensor installed at a side of a display unit, and displays the image obtained by the image sensor in the sub screen display area. If a signal for photographing is detected while previewing the image, the device obtains a main screen image and a sub screen image at the time of photographing in the preview state, and processes and stores the sub screen image by synthesizing in a sub screen area in the main screen. Hereafter, the camera device or the image sensor will be called an electronic device, and the electronic device may be a smart phone, a tablet, a computer, or any device having a camera device. The electronic device may include more than one image sensor. The camera device or the portable terminal having an image sensor is assumed to be equipped with a dual image sensor. Further, the dual image sensor of the electronic device is assumed to be installed respectively at the rear side and the front side of the device where the display unit is installed, and the front image sensor is assumed to be located in a bezel area of the display unit.

Here, the image sensor installed at the rear side of the device may be a first image sensor installed at a first surface of the device, and the image sensor installed at the front side of the device may be a second image sensor installed at a second surface of the device. The image sensor may include image sensors connected to the terminal as well as image sensors functionally connected through a wireless system such as a Near Field Communication (NFC) system, a WiFi system, and the like. Accordingly, the electronic device according to various embodiments of the present disclosure is equipped with a first image sensor installed at the rear side of the device and a second image sensor installed at the front side of the device where a display unit is provided, and displays an image photographed by the first image sensor as a main screen in a preview mode of dual photographing and images photographed by the second image sensor as a sub screen (e.g., a Picture In Picture (PIP) screen) in the main screen. Here, a sub screen display area may be displayed by moving to an area in the main screen adjacent to the second image sensor. If a user requests for photographing in the preview mode, the electronic device synthesizes and stores the sub screen image in the main screen image. Here, the electronic device may synthesize the sub screen image after moving to a location of the main screen.

In the preview mode, the electronic device may display the main screen image photographed by the first image sensor in the whole area or a partial area of the display unit. The electronic device may display the sub screen image photographed by the second image sensor at a location physically closer to the second image sensor, or both at a location where the sub screen image is actually stored and at a location physically closer to the second image sensor. Alternatively, the electronic device may display the sub screen image at a location physically closer to the second image sensor in the preview mode, and display only the frame in an actually storing location when synthesizing the sub screen image with the main screen image to store a dual image. In this case, the frame may be displayed in a different form by displaying an inner part or a border line of the frame with a different color, a dotted line, or the like.

If execution of a photographing function is requested in the preview mode of the dual image, the electronic device stores the second image of the sub screen photographed by the second image sensor after moving and synthesizing in a location of the main screen, and the synthesized image of the main screen and sub screen may be displayed with more than one frame in the display unit. Further, when synthesizing the sub screen image photographed by the second image sensor with the main screen image photographed by the first image sensor, the electronic device may decide a synthesizing location of the sub screen image by receiving a storing location input by a user, or decide the synthesizing location of the sub screen image in a background of the first image obtained by the first image sensor by searching the background through an image analysis.

FIG. 1 is a block diagram illustrating a configuration of an electronic device according to an embodiment of the present disclosure.

Referring to FIG. 1, a first image sensor 120 (e.g., a rear image sensor) may be installed at the rear side of the device, and a second image sensor 125 (e.g., a front image sensor) may be installed in a bezel of the front side of the device. The first image sensor 120 may be an image sensor having a higher number of pixels than that of the second image sensor 125. The first image sensor 120 and second image sensor 125 may independently or simultaneously be driven under the control of a control unit 100. Further, the first image sensor 120 and second image sensor 125 may photograph a still or a moving image under the control of control unit 100.

The control unit 100 controls the general operation of the electronic device. The control unit 100 may drive the first image sensor 120 and/or the second image sensor 125 independently or simultaneously, control to display photographed images in a dual screen having a main screen and a sub screen when the image sensors are driven according to an embodiment of the present disclosure, and control a photographing and editing of the dual screen. Here, the sub screen may be a PIP screen.

A storage unit 110 may be equipped with a program memory for storing an operation program and programs according to embodiments of the present disclosure, and a data memory for storing photographed images.

A display unit 130 may be installed at the front side of the device together with the second image sensor 125, and may display images photographed by the first image sensor 120 and/or second image sensor 125 under the control of the control unit 100. The display unit 130 may be a Liquid Crystal Display (LCD) or an Organic Light Emitting Diode (OLED) type display. An input unit 140 may generate input signals for controlling a photographing operation of the electronic device. Here, the display unit 130 and the input unit 140 may be integrated into a touch screen.

A sensor 150 may include at least one sensor to detect the state of the electronic device. The sensor may be a geomagnetic sensor, an acceleration sensor, a gyro sensor, and the like, and generate a signal for detecting a change of device state according to a motion of the electronic device, such as a rotation, an orientation, and the like to output to the control unit 100.

The control unit 100 of the electronic device having the above configuration may obtain a plurality of images by simultaneously driving the first image sensor 120 and second image sensor 125, and display the obtained images in a main screen and a sub screen of the display unit 130. Here, the control unit 100 may change the main screen and the sub screen according to a user's selection. Further, the electronic device may photograph by simultaneously or sequentially driving the first image sensor 120 and second image sensor 125 if photographing (dual shot) is requested in a dual mode, and generate a still image by synthesizing the photographed main screen and sub screen image.

The electronic device having a first image sensor 120 and a second image sensor 125 generally photographs a main screen (e.g., landscape and/or portrait as a first image) by using the first image sensor 120 and photographs a photographer (e.g., the user as a second image) by using the second image sensor 125. In this case, the user can identify a first image being photographed by the first image sensor 120 and a second image being photographed by the second image sensor 125 through the display unit 130. When displaying the first image photographed by the first image sensor 120 and the second image photographed by the second image sensor 125 in the display unit 130 in a preview mode, the sub screen may be fixed to a specific location of the display unit 130. In this case, if the distance between the display positions of the sub screen and the second image sensor 125 is great, a second image having a desired eye direction cannot be easily obtained.

Figure 2A:
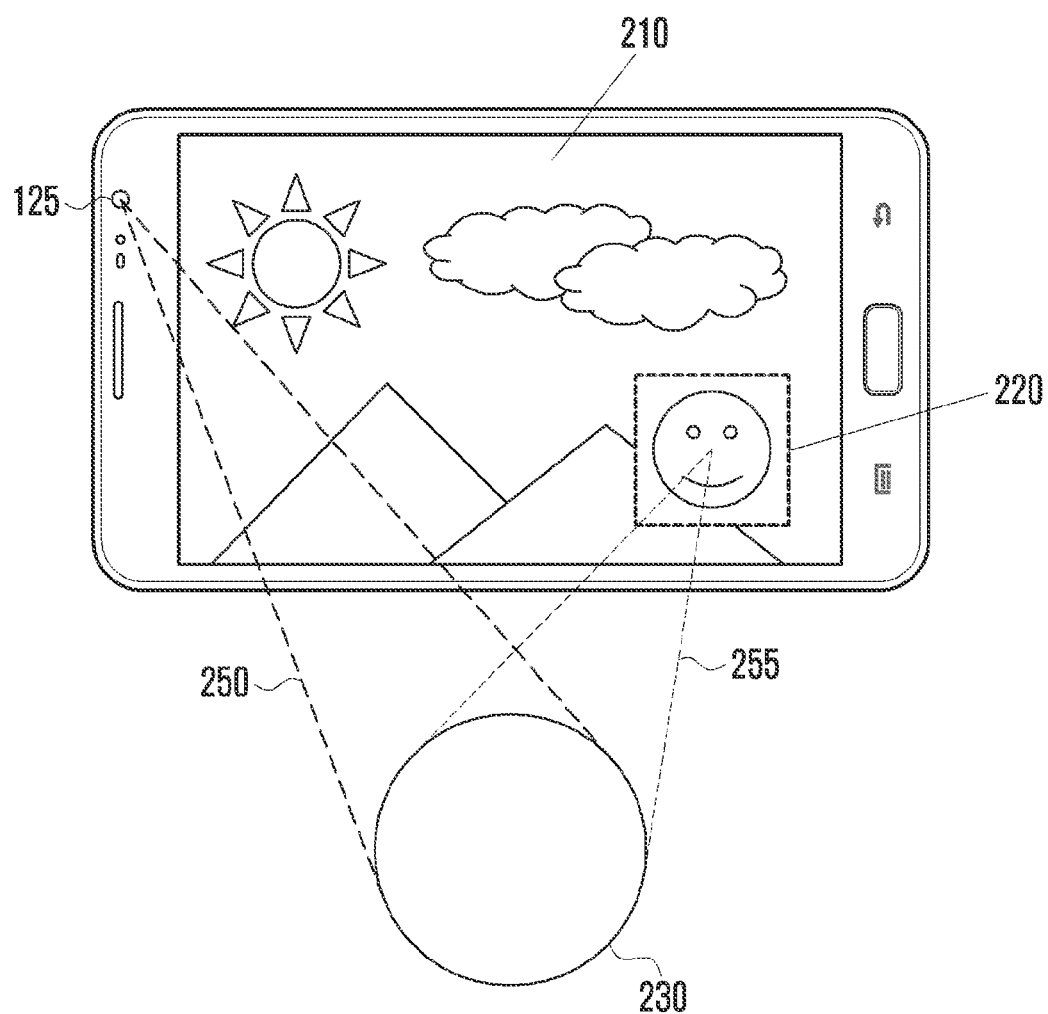
FIGS. 2A, 2B, and 2C are drawings illustrating a procedure of obtaining and processing a second image in a dual photographing mode according to an embodiment of the present disclosure.
Figure 2B:
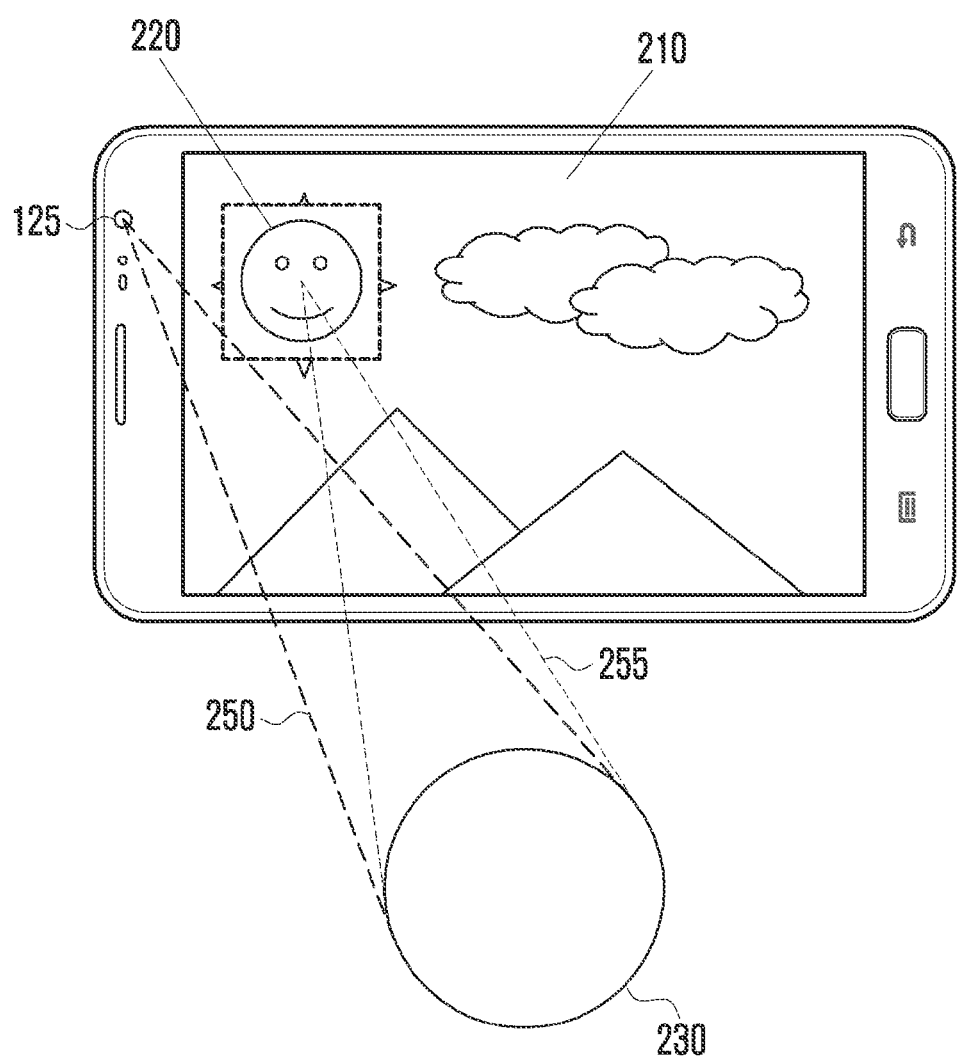
Figure 2C:
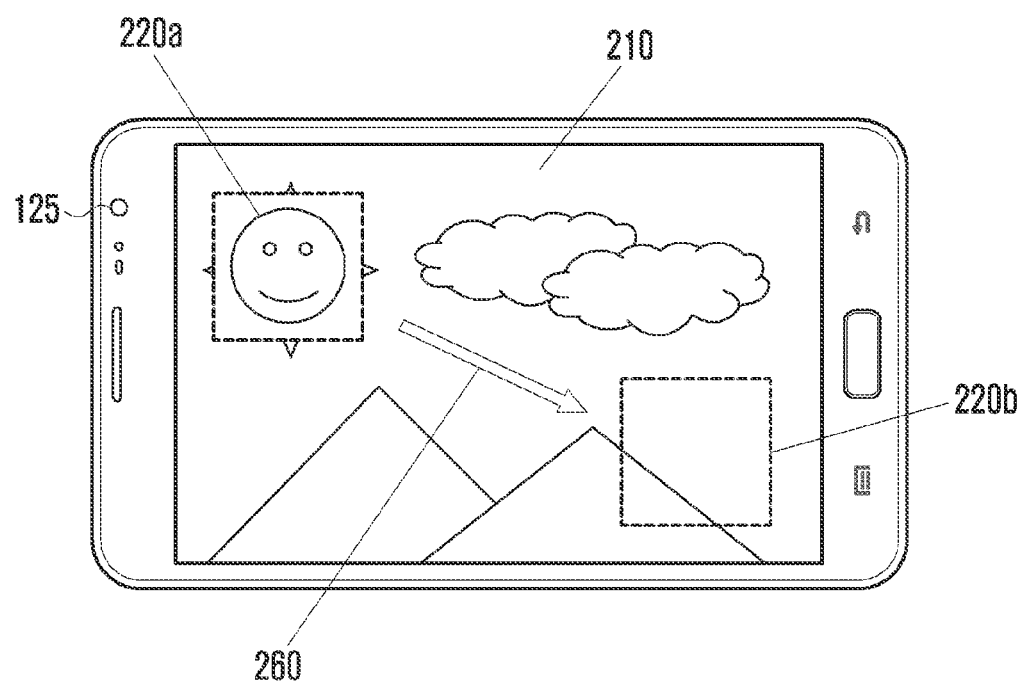

FIGS. 2A to 2C are drawings illustrating a procedure of obtaining and processing a second image in a dual photographing mode according to an embodiment of the present disclosure.

Referring to FIGS. 2A to 2C, in the preview mode of simultaneously driving the first image sensor 120 and second image sensor 125, the control unit 100 may display a first image photographed by the first image sensor 120 in a main screen 210 and a second image photographed by the second image sensor 125 in a sub screen 220. Here, the control unit 100 may set a display area of the sub screen 220 to display the second image photographed by the second image sensor 125 in the lower left area of the display unit 130 as shown in FIG. 2A. In FIG. 2A, the second image sensor 125 and the sub screen 220 may have a great distance. In a dual photographing mode, a user 230 may take a photograph while looking at the image 210 and/or image 220 displayed in the display unit 130. In this case, a photographing angle of the second image sensor 125 is formed as shown by reference number 250, and thereby a user can see the sub screen 220 photographed as shown by reference number 255. Accordingly, if the second image sensor 125 and the sub screen 220 are located at a great distance, an angle difference is generated between an area 250 actually photographed by the image sensor 125 and an area 255 at which the user 230 looks, and thereby an image photographed by the image sensor 125 can aim at the left part of the actually photographed image. This difference becomes greater as the size of the display unit 130 increases. Here, the reference number 250 indicates an area in which the second image sensor 125 actually photographs a subject (photographer), and the reference number 255 indicates an area at which the photographer looks for photographing, i.e., an area at which a face and eyes are directed.

When photographing a first image and a second image by using the dual image sensor of the electronic device, the photographer can take a photo in a state of looking at the second image sensor 125 if the display position of the second image in the sub screen 220 is close to the second image sensor 125, and thereby can obtain a second image having a natural posture. FIG. 2B illustrates an example of locating the display position of the sub screen 220 close to the second image sensor 125 according to an embodiment of the present disclosure. As shown in FIG. 2B, the difference between the area 255 at which the user 230 looks and the area 250 of actual photographing becomes smaller, and thereby the user 230 can photograph in a pleasant condition.

For this, the control unit 100 according to an embodiment of the present disclosure detects a device state (e.g., rotation, location, etc.) through the sensor 150 in a preview mode, identifies a state of the second image sensor 125 according to the detected location of the device, and displays a sub screen 200 by moving the display position of the sub screen 220 closer to the second image sensor 125 as shown in FIG. 2B.

If the user generates a photographing command (e.g., shutter switch on) through the input unit 140 in the state of displaying a dual image (i.e., a main screen image and a sub screen image), the control unit 100 detects it, and stores images in the storage unit 110 by capturing and synthesizing the first image output by the first image sensor 120 and the second image output by the second image sensor 125. If the display position of the sub screen 220 is changed according to the location of the second image sensor 125, the location of sub screen 220 synthesized into the main screen 210 may change. In this case, the control unit 100 may synthesize and store the second image as displayed in the preview mode as shown in FIG. 2B, or synthesize and store by moving the image of sub screen 220 as shown in FIG. 2A.

In an embodiment of the present disclosure, it is assumed that the latter method is used for synthesizing and storing the sub screen image. For example, if a dual image photographing is requested, the control unit 100 stores a dual image shown in FIG. 2B by synthesizing as shown in FIG. 2A. Here, the control unit 100 may apply an effect of moving the second image in the display unit 130. As shown in FIG. 2C, in the preview mode, a sub screen image shown by 220a is located at 220b by moving along the arrow mark 260 (for example, animation), and an actually stored sub screen image may be displayed in the main screen image 210 as shown by 220b. The control unit 100 can display the dual image stored in the storage unit 110 through the display unit 130.

When displaying the sub screen by moving closer to the second image sensor 125 in the preview mode as shown in FIG. 2B, the control unit 100 may display an original location of the sub screen to be synthesized. For example, as shown in FIG. 2C, the control unit 100 may display a location of the sub screen to be synthesized as shown by 220b in the state of displaying the sub screen 220a in a location closer to the second image sensor 125. In this case, the location 220b for synthesizing the sub screen image may be displayed in an image frame. The image frame may be expressed with a border line (for example, dotted line), or the inner part or border line of the image frame may be displayed in a different color.

Figure 3:
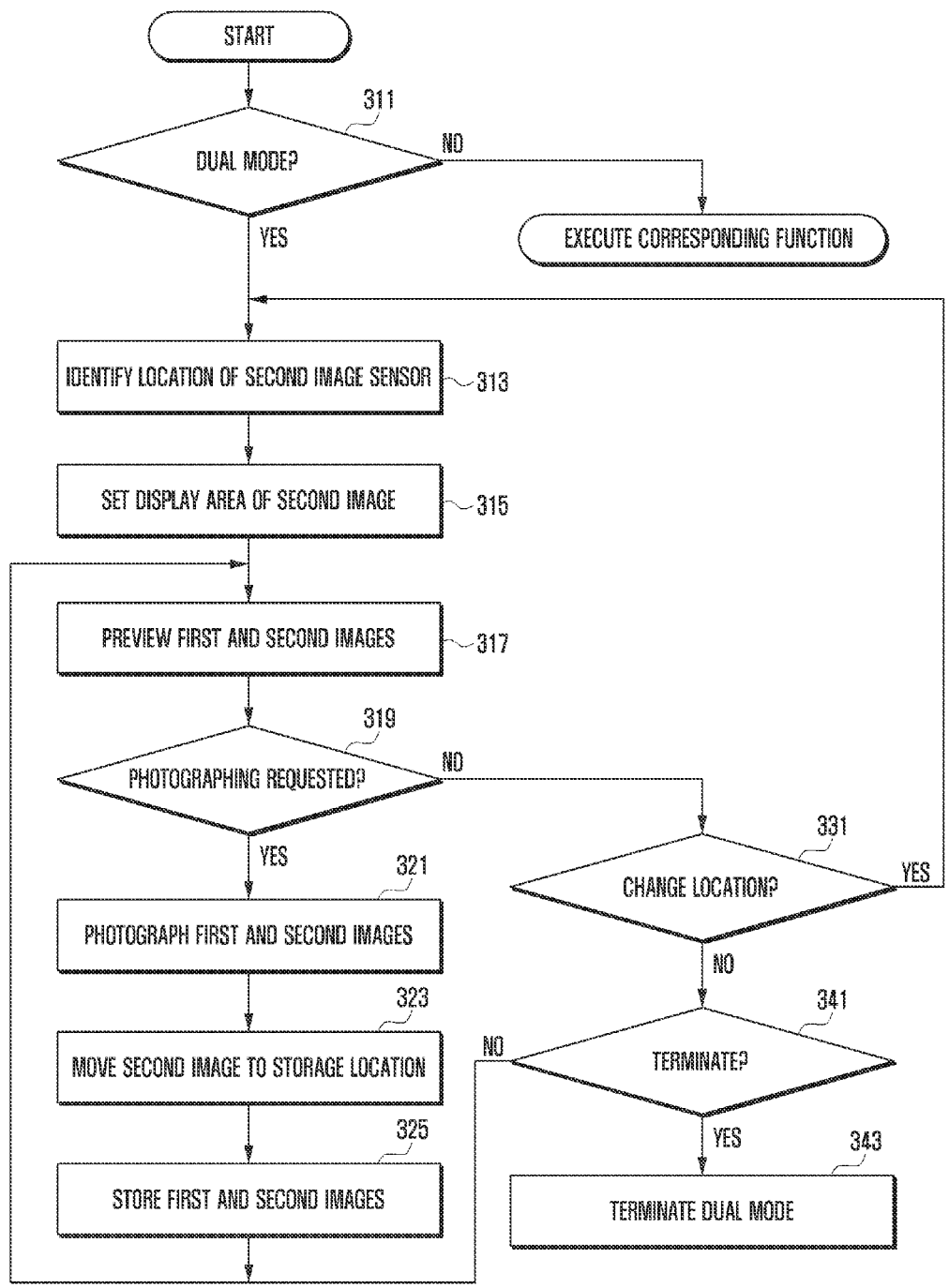
FIG. 3 is a flowchart illustrating a procedure of photographing an image in an electronic device according to an embodiment of the present disclosure.

FIG. 3 is a flowchart illustrating a procedure of photographing an image in an electronic device according to an embodiment of the present disclosure.

Referring to FIG. 3, if driving the dual image sensor is requested through the input unit 140, the control unit 100 detects the request at operation 311, and identifies the location of the second image sensor 125 by analyzing the location of device from an output of the sensor 150 at operation 313. Subsequently, the control unit 100 sets a display area of the second image (i.e., display area of the sub screen) at a location closer to the identified location of the second image sensor 125 at operation 315.

Figure 4:
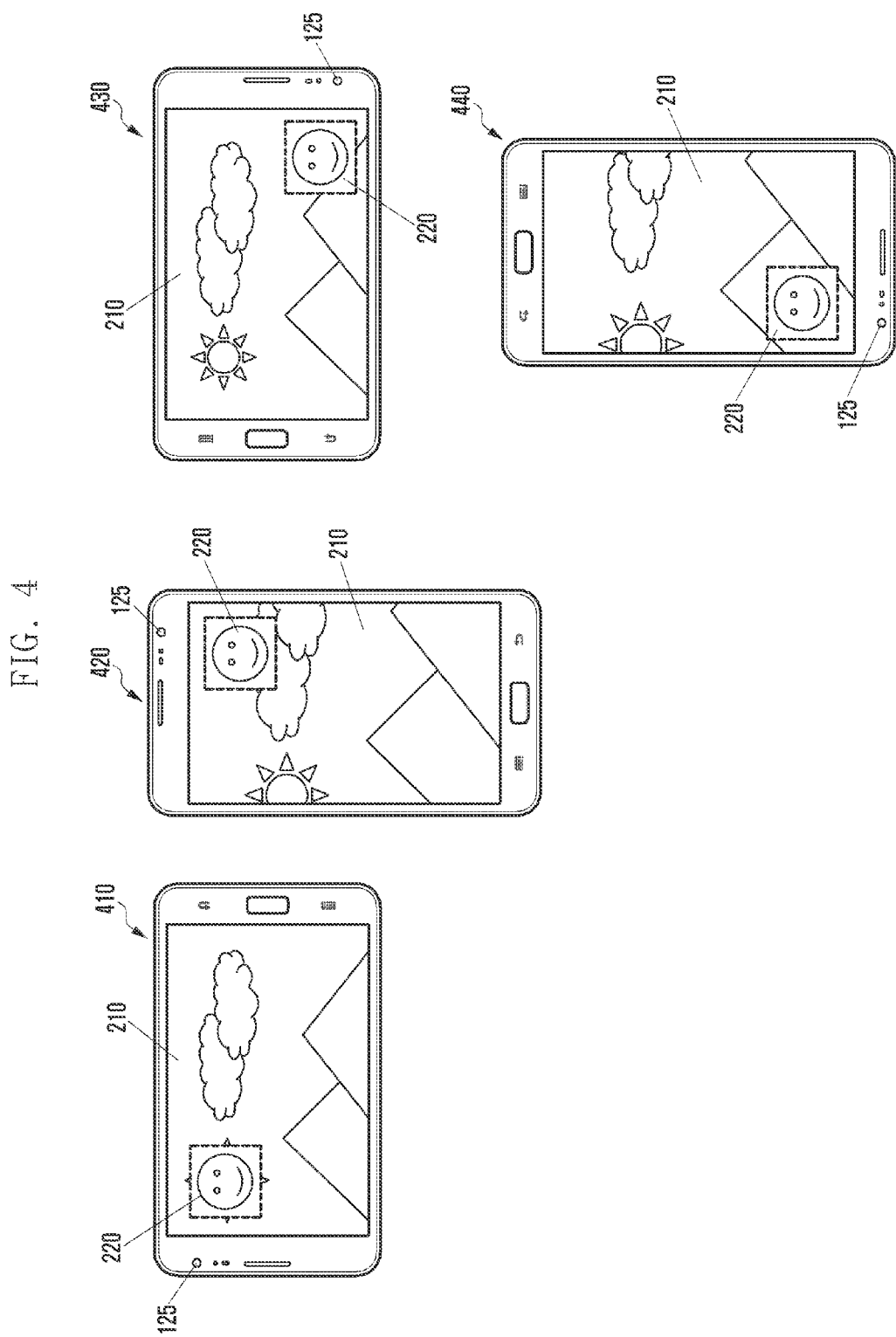
FIG. 4 is a drawing illustrating a method of deciding a location of a sub screen display area in which a second image is photographed by a second image sensor according to an embodiment of the present disclosure.

FIG. 4 is a drawing illustrating a method of deciding a location of a sub screen display area in which a second image is photographed by a second image sensor according to an embodiment of the present disclosure.

Referring to FIG. 4, the control unit 100 analyzes a state (e.g., rotation) of a device by using an output of the sensor 150 in a dual mode, and can determine the location of the second image sensor 125 according to the identified state of the device. The device can have four states 410, 420, 430 and 440 as shown in FIG. 4. Here, the device states 410 and 430 illustrate examples of a landscape display mode, and the device states 420 and 440 illustrate examples of a portrait display mode. The device state 430 of FIG. 4 illustrates a state in which the device state 410 is rotated by 180 degrees, and if the device is rotated by 180 degrees, the second image sensor 125 becomes located at the other side. The device state 440 of FIG. 4 illustrates a state in which the device state 420 is rotated by 180 degrees, and if the device is rotated by 180 degrees, the second image sensor 125 becomes located at the other side. If the location of the image sensor 125 is identified according to the rotation of the device, the control unit 100 can set a display area of the sub screen 220 by moving to a location closer to the second image sensor 125 at operation 315 as shown by 410 and 430 of FIG. 4.

Referring again to FIG. 3, after determining the display area of the sub screen 220 in a corresponding location by identifying the location of the second image sensor 125, control unit 100 can perform a preview mode in the dual mode at operation 317. In the preview mode, the control unit 100 drives both the first image sensor 120 and the second image sensor 125, displays a first image output by the first image sensor 120 in the main screen of the display unit 130, and displays a second image output by the second image sensor 125 in the sub screen display area set at operation 315. Here, the control unit 100 may be equipped with an image processing unit (e.g., an image signal processor), and the image processing unit may include an image pre-processing unit, a post-processing unit, an image scaler, and a codec. In this case, the first image output by the first image sensor 120 is pre-processed and post-processed by the image processing unit, and the image scaler outputs the first image to the display unit 130 by scaling to the size of main screen. The second image output by the second image sensor 125 is pre-processed and post-processed by the image processing unit, and the image scaler outputs the second image to the display unit 130 by scaling to the size of the sub screen.

In the preview mode of the dual mode, the control unit 100 may select an image sensor to display a main screen image according to a user's selection. For example, a user may select an image output by the first image sensor 120 or second image sensor 125 as a main screen image by using an image sensor selection button. In this case, the control unit 100 may process an output of an image sensor selected by the user as a main screen image and an output of the other image sensor as a sub screen image. The control unit 100 processes the main screen image and outputs to the display unit 130, and processes the sub screen image and displays in a location of the main screen. Here, the sub screen image may be output by resizing to a size in the main screen.

In an embodiment of the present disclosure, if an output of the second image sensor 125 is selected for the sub screen in the dual mode, the display position of the sub screen is changed to a location closer to the second image sensor 125, and if an output of the first image sensor 120 is selected for the sub screen, the display position of the sub screen may be fixed. Accordingly, if the output of the second image sensor 125 is selected as a sub screen image, the control unit 100 may display the first and second images in the display unit 130 in a state of 410 to 440 in FIG. 4 according to the location of the second image sensor 125.

While performing the preview mode, the control unit 100 identifies a change of the device (e.g., location, rotation, orientation, etc.) by analyzing an output of the sensor 150. If a rotation of the device is generated, the control unit 100 detects it at operation 331, and sets the display area of the sub screen 200 according to the location change of the second image sensor 125 by performing operations 313 and 315.

If the user requests for photographing (e.g., shutter button on) through the input unit 140 in the state of performing the preview mode, the control unit 100 detects it at operation 319, and captures a first image output by the first image sensor 120 and a second image output by the second image sensor 125 at operation 321. Here, the operation of capturing the first image and second image may be performed in a procedure as shown in FIG. 5.

Figure 5:
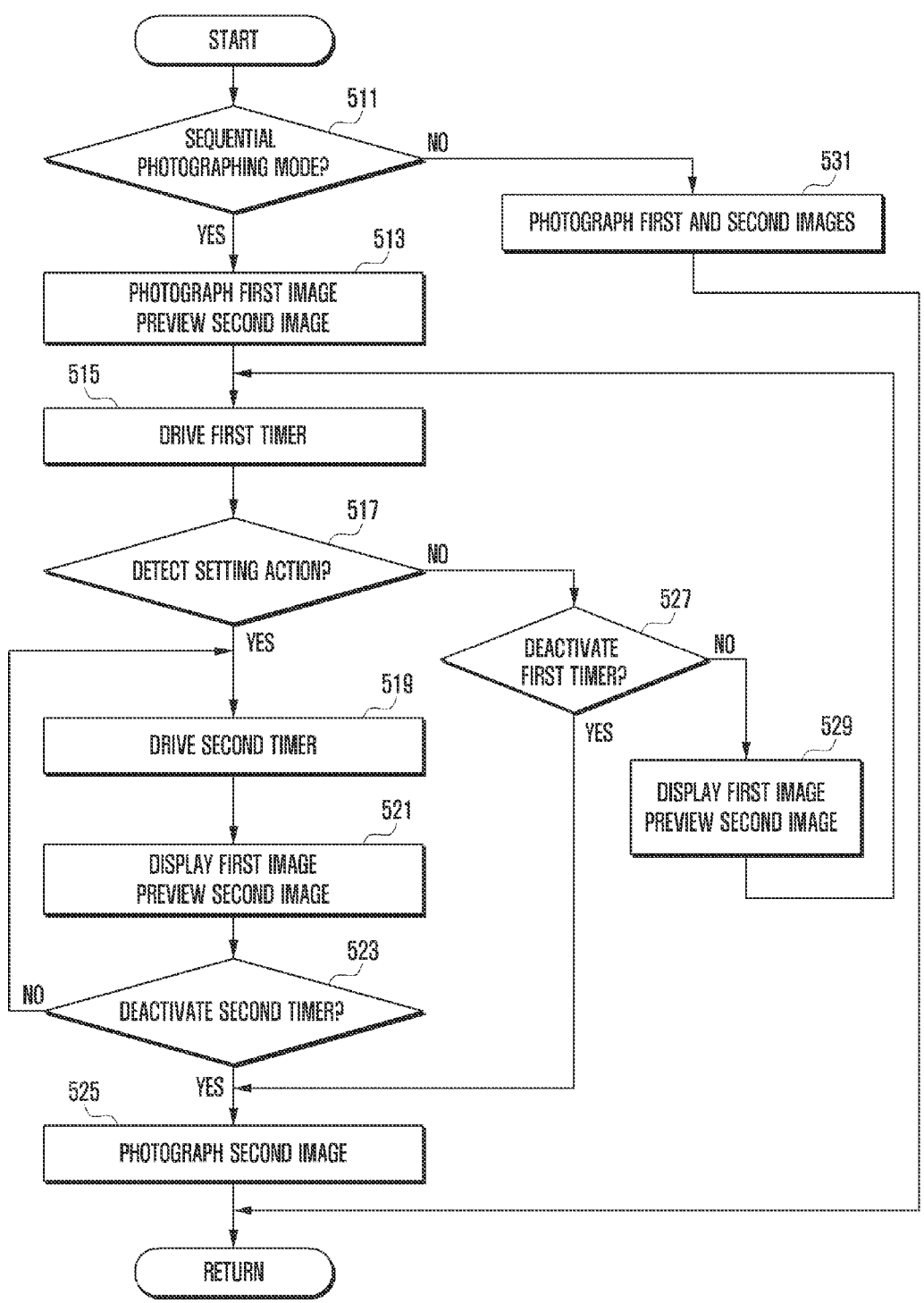
FIG. 5 is a flowchart illustrating a procedure of photographing a first image and a second image in a dual mode according an embodiment of the present disclosure.

FIG. 5 is a flowchart illustrating a procedure of photographing a first image and a second image in a dual mode according an embodiment of the present disclosure.

Referring to FIG. 5, the photographing in a dual mode may use a synchronous or an asynchronous photographing method which can be set in a setting mode. If the user sets an image sensor in the setting mode, the control unit 100 may display a photographing mode menu including a dual shot mode in the display unit 130. If the user selects the dual shot mode, the control unit 100 displays a dual shot menu, and the dual shot menu may display a synchronous photographing or an asynchronous photographing. Here, the synchronous photographing is a photographing mode of simultaneously obtaining a first image and a second image respectively from the first image sensor 120 and the second image sensor 125, and the asynchronous photographing is a photographing mode of obtaining a sub screen image from an image sensor after obtaining a main screen image from the other image sensor. If a photographing is requested, the synchronous photographing can simultaneously process images output by the two image sensors to still images. In a dual shot photographing, the user generally sets the main screen image so as to fit a photographing composition. However, the photographing composition of sub screen image may be in an undesirable state. In this case, it may be desirable to use an asynchronous photographing method. The asynchronous photographing method firstly photographs by setting a main screen image to a desired photographing composition, and by setting a sub screen image to another desired photographing composition. In an embodiment of the present disclosure, the synchronous or asynchronous photographing may be selected by a user when setting a dual shot mode.

If a photographing is requested by the user, the control unit checks the photographing mode at operation 511. If the photographing mode is a synchronous photographing mode at operation 511, the control unit 100 captures an image obtained by the currently operating image sensor (e.g., the first image sensor 120 or the second image sensor 125) at operation 531.

If the photographing mode is an asynchronous photographing mode at operation 511, the control unit 100 performs the asynchronous photographing mode. Here, the control unit 100 can guide the user by displaying the current main screen and sub screen being sequentially photographed in the display unit 130. In the asynchronous photographing mode, the control unit 100 may photograph a main screen image and display a sub screen image in a preview state at operation 513. Here, the sub screen displayed in the preview state may be an image photographed by the second image sensor 125, and the display position of the sub screen may be located closer to the second image sensor 125 as previously described. The control unit 100 controls the display unit 130 to display the first image of the main screen as a still image and the second image of the sub screen as a preview image.

After capturing the main screen image, the control unit 100 drives a timer at operation 515, and determines whether an action is detected at operation 517. For example, the control unit 100 can capture a sub screen image if the action is detected after the timer is driven until the timer is expired. Here, the action may be switching a shutter switch on (i.e., a photographing request for capturing a second image) or an operation of a device (e.g., a hovering or touch interaction of a specific area, shaking, rotating, motion of a device, etc.).

If the action is not detected while the timer is driving, the control unit 100 detects it at operation 527, and displays the captured first image in a main screen by processing as a still image and a second image photographed by the second image sensor 125 in a sub screen display area as a preview image at operation 529. Here, the first timer driven at operation 515 may provide a time for the user to set a composition for the second image to be captured through the second image sensor 125 after capturing the main screen image. However, if the first timer is expired in a state that the action is not detected since the first timer is started, the control unit 100 detects it at operation 527, and captures a second image at operation 525. Here, the second image may be a sub screen image. The main screen image remains in a captured state, and thereby the main screen can be displayed as a still image.

However, if the action is detected before the expiration of the first timer driven at operation 515, the control unit 100 detects it at operation 517, and drives a second timer at operation 519. The second timer driven at operation 519 provides a time for the user to set a composition of a second image to be captured by the second image sensor 125 since the action is performed. Here, the period of the second timer driven at operation 519 may be identical to that of the first timer or different from that of the first timer. Before the expiration of the second timer, the control unit 100 displays the captured first image in a main screen by processing to a still image and a second image photographed by the second image sensor 125 in a sub screen display area as a preview image at operation 521. If the first timer expires, the control unit 100 detects it at operation 523, and captures a second image at operation 525.

Figure 6A:
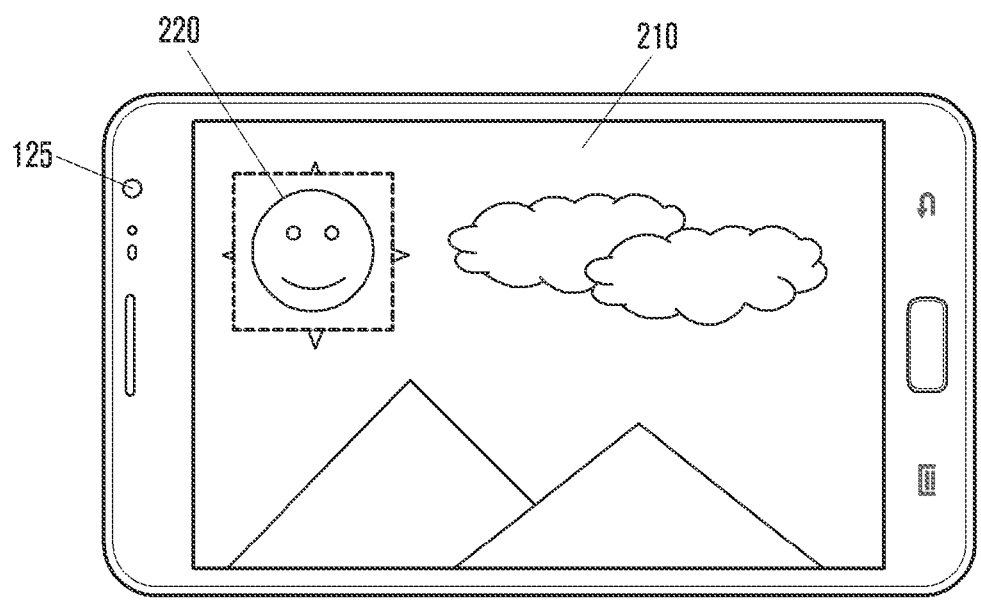
FIGS. 6A and 6B are drawings illustrating a movement of a location of a sub screen display area according to an embodiment of the present disclosure.
Figure 6B:
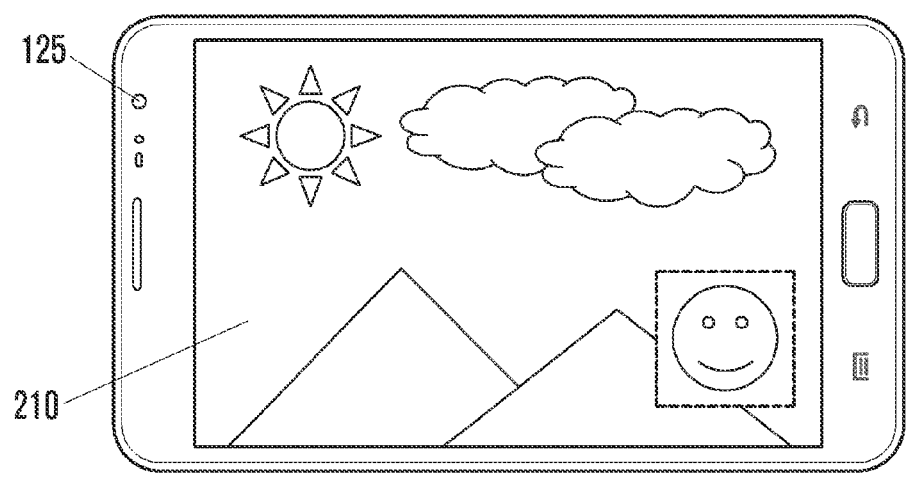

FIGS. 6A and 6B are drawings illustrating a movement of a location of a sub screen display area according to an embodiment of the present disclosure.

Referring to FIGS. 6A and 6B, while performing the procedure of FIG. 5, the control unit 100 can capture a first image (i.e., a main screen image) output by the first image sensor 120 and a second image (i.e., a sub screen image) output by the second image sensor 125. Here, the sub screen image is variably set according to the location of the second image sensor 125 in the preview mode as shown in FIG. 6A, and if a photographing is requested, the control unit 100 can capture a second image from a location adjacent to the second image sensor 125 (i.e., capture position). When synthesizing the captured second image, the control unit 100 can synthesize the captured sub screen image in a location of the sub screen (i.e., save position) as shown in FIG. 6B. Accordingly, the control unit 100 captures a first image and a second image at a capture position according to operation 321 of FIG. 3 and the procedure of FIG. 5, moves the second image captured at operation 323 of FIG. 3 to a sub screen location (i.e., save position) as shown in FIG. 6B, and stores the second image after synthesizing with the first image at operation 325. Here, the control unit 100 may or may not display a movement of the second image to a sub screen location in the display unit 130 at operation 323.

If a location change is not detected at operation 331, the control unit 100 determines if the dual mode photographing is to be terminated at operation 341. If the dual mode photographing is to be terminated, the control unit 100 terminates the dual mode photographing at operation 343. Otherwise, the control unit 100 returns to operation 317.

Figure 7:
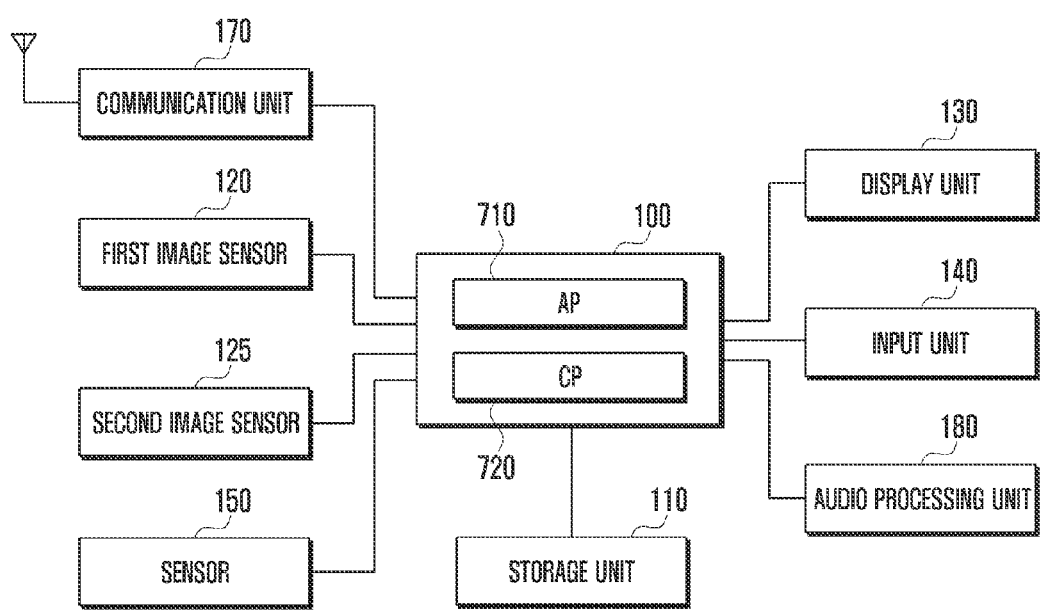
FIG. 7 is block diagram illustrating a configuration of a portable terminal operating according to an embodiment of the present disclosure.

FIG. 7 is block diagram illustrating a configuration of portable terminal operating according to an embodiment of the present disclosure. Here, the portable terminal may be any of various digital equipment such as a mobile phone including a smart phone, an MP3 terminal, a tablet, a computer, and the like.

Referring to FIG. 7, a communication unit 170 performs a function of communicating with a base station or an internet server. The communication unit 170 may be configured with a transmitter for frequency up-converting and electrically amplifying a transmitting signal, and a receiver for low noise amplifying and frequency down-converting a received signal. Further, the communication unit 170 may include an encoder and a decoder. The encoder outputs a transmitting signal to the transmitter by encoding the signal and the decoder decodes a signal received by the receiver. The codec (encoder+decoder) may include an LTE, WCDMA, GSM, WIFI, WIBRO, NFC, and Bluetooth. In an embodiment of the present disclosure, it is assumed that the communication unit 170 includes an LTE, WIFI, and Bluetooth.

A first image sensor 120 is an image sensor installed at the rear side of the portable terminal, and photographs an image in a high resolution. A second image sensor 125 is an image sensor installed at the front side of the portable terminal, and photographs an image in a lower resolution than the first image sensor 120.

A control unit 100 controls the general operation of the portable terminal, and may include an Application Processor (AP) 710 for controlling various applications of the portable terminal and a Communication Processor (CP) 720 for controlling a communication function of the portable terminal. The application processor 710 controls to process images obtained by the first image sensor 120 and second image sensor 125 in a dual mode according to an embodiment of the present disclosure, to display a second image by setting a sub screen display area at a location closer to the second image sensor 125 (capture position) in a preview mode, and to capture a second image in the location closer to the second image sensor 125 and save the second image by synthesizing in a location of a main screen (save position) in a capture mode.

A storage unit 110 may include a program memory storing an operation program of the terminal and programs according to various embodiments of the present disclosure, and a data memory storing tables for the operation of the terminal and data generated during the execution of programs.

A display unit 130 may display information of an application being executed under the control of the control unit 100. The display unit 130 may display images of a main screen and a sub screen under the control of the control unit 100 in a dual image sensor mode. The display unit 130 may be an LCD, an OLED, and the like. An input unit 140 may be provided in a capacitive or resistive type, and can output location information of a user's touch (e.g., a finger touch) to the control unit 100. The input unit 140 may further include an EMR sensor pad, and can detect and output a pen touch input to the control unit 100. The display unit 130 and the input unit 140 may be configured in an integrated form.

A sensor 150 may include various sensors for detecting a movement of the portable terminal, such as an acceleration sensor, a geomagnetic sensor, a gyro sensor, a location detecting sensor, and the like. An audio processing unit 180 processes a voice signal generated in a communication mode under the control of the control unit 100.

The control unit 100 of the portable terminal having the above configuration controls the display unit 130 to display images output by the image sensor 120 and/or the image sensor 125. An image sensor button for selecting an image sensor to display a main screen image in the display unit 130 and a dual button for switching on/off the dual mode are displayed in the display unit 130. If the buttons are touched, the control unit 100 can detect an on/off state of a corresponding button through the input unit 140. Accordingly, the control unit 100 performs a dual mode to drive the first image sensor 120 and the second image sensor 125 if a user touches the dual button, and can display images output by the image sensors 120 and 125 respectively on a main screen and a sub screen of the display unit 130 as a dual image. The control unit 100 can select an image sensor to output a main screen image according to a user's selection of an image sensor button in the dual mode. In an embodiment of the present disclosure, it is assumed that the first image sensor 120 is selected for a main screen image and the second image sensor 125 is selected for a sub screen image when the portable terminal is driven in a dual mode.

In the portable terminal having the above configuration, the control unit 100 can perform a dual mode. In a preview mode of the dual mode, the control unit 100 identifies a location of the second image sensor 125 as shown in FIG. 3, and sets a sub screen display area in the display unit 130 closer to the identified location of the second image sensor 125. If the distance between the second image sensor 125 and the sub screen display area is great as shown in FIG. 2A, user's face and eyes photographed by the second image sensor 125 are directed to the sub screen display area, and thereby the photographed second image can have an unnatural posture. Therefore, an embodiment of the present disclosure suggests an apparatus and a method for setting a sub screen display area so that a photographing angle (i.e., shooting angle) of the second image sensor 125 coincides with a direction of the user's face and eyes as shown in FIG. 2B. For example, in the dual mode according to an embodiment of the present disclosure, the control unit 100 may use a method of setting a sub screen display area in the display unit 130 closest to the second image sensor 125 installed at the front side of the portable terminal. If the portable terminal rotates in the preview mode, the sub screen display area moves in a rotating direction of the second image sensor 125 as shown in FIG. 4. Here, the sub screen display area set closer to the second image sensor 125 may be located at a capture position for capturing the second image.

If photographing is requested in the preview mode, the control unit 100 can capture a first image and a second image using the procedure of FIG. 5. The first image and the second image may be captured by a synchronous or an asynchronous photographing method, and the second image may be captured at a position closer to the second image sensor 125. Subsequently, the control unit 100 synthesizes the second image with the first image, and the synthesizing location (i.e., save position) of the second image may be a location (e.g., the lower left side of the main screen image as in FIG. 6B). Accordingly, the control unit can synthesize the captured second image with the first image by moving to the synthesizing location. The control unit 100 displays the synthesized first image and the second image respectively in a main screen and a sub screen of the display unit 130, and the synthesized image displayed in the display unit 130 may be stored in the storage unit 110.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for processing an image using an electronic device, the method comprising:
    displaying, using a display functionally connected to the electronic device, at least a portion of a first image obtained by a first image sensor functionally connected to the electronic device as a first preview image;
    displaying at least a portion of a second image obtained by a second image sensor functionally connected to the electronic device as a second preview image together with the first preview image, in a partial region of the display on a same side of the electronic device as the second image sensor and adjacent to the second image sensor, and
    determining, using a computer processor of the electronic device, a location of the partial region based on a location of the second image sensor.

2. The method of claim 1,
    wherein the displaying of the first preview image comprises displaying the first preview image as a first screen in the display, and
    wherein the displaying of the second preview image comprises displaying the second preview image as a second screen in the display.

3. The method of claim 1, further comprising:
    storing the second preview image and displaying the second preview image by synthesizing at least in a location of the first preview image, if a request for photographing is detected.

4. The method of claim 1, wherein the displaying of the second preview image comprises:
    determining a location of the second image sensor, if a movement of the electronic device is detected; and
    displaying an area of the display adjacent to the second image sensor as the area of the display for displaying the second preview image.

5. The method of claim 4, wherein the area of the display for displaying the second preview image is set as a capture position in a location adjacent to the second image sensor in a preview mode and set as a storage position in a location in the area of the display for displaying the first preview image in a photographing mode.

6. The method of claim 5, wherein the storage position is moved by a user.

7. The method of claim 5, wherein the setting as the storage position comprises displaying the area of the display for displaying the second preview image in the storage position in a form set by the user.

8. The method of claim 7, wherein the displaying in the form set by the user comprises displaying the area of the display for displaying the second preview image in the storage position in at least one of a border line and a color.

9. The method of claim 5, wherein the first image and the second image are stored, and the second image is set to be displayed in the storage position by synthesizing, if a request for photographing is detected.

10. The method of claim 5, further comprising:
    storing the first image and driving a timer while previewing the second image, if a request for photographing is detected;
    storing the second image if the driving of the timer is terminated; and
    storing the second image by synthesizing in the storage position of the first image.

11. The method of claim 4, wherein the detected movement of the electronic device comprises at least one of a change in location, a rotation, and a change in orientation.

12. An electronic device, the electronic device comprising:
    a first image sensor configured to obtain a first image corresponding to at least a portion of a first surface of the electronic device;
    a second image sensor configured to obtain a second image corresponding to at least a portion of a second surface of the electronic device; and
    a controller configured to:
        display at least a portion of the first image as a first preview image in a display functionally connected to the electronic device,
        display at least a portion of the second image as a second preview image together with the first preview image, in a partial region of the display on a same side of the electronic device as the second image sensor and adjacent to the second image sensor, and
        determine a location of the partial region is determined based on a location of the second image sensor.

13. The electronic device of claim 12, further comprising:
    a sensor configured to detect a movement of the device,
    wherein the control unit is further configured to display a second image preview area in a first image display area adjacent to the rotated second image sensor, if a movement of the device is detected.

14. The electronic device of claim 13, wherein the control unit is further configured to store the second image in a location of the first image if a request for photographing is detected.

15. The electronic device of claim 13, wherein the control unit is further configured to:
    preview the second image in a location adjacent to the second image sensor, and
    display the second image display area designated in the first image in a form.

16. The electronic device of claim 15, wherein the second image display area designated in the first image is displayed in at least one of a border line and a color.

17. The electronic device of claim 14, wherein the control unit is further configured to display a movement of the second image when storing the second image.

18. The electronic device of claim 13, wherein the control unit is further configured to:
    individually store the first image, and
    store the second image by synthesizing in a location of the first image, if a request for photographing is detected.

19. The electronic device of claim 13, wherein the control unit is further configured to:
    store the first image and drive a timer after previewing the second image if a request for photographing is detected,
    store the second image if the driving of the timer is terminated, and
    store the second image by synthesizing in a location of the first image.

20. The electronic device of claim 13, wherein the control unit is further configured to:
    store the first image and to preview the second image if a request for photographing is detected, to drive a timer if an action is detected,
    store the second image if the driving of the timer is terminated, and
    store the second image by synthesizing in a location of the first image.

21. The electronic device of claim 13, wherein the control unit detects movement of the electronic device by detecting at least one of a change in location, a rotation, and a change in orientation of the electronic device.

22. A non-transitory image storage media, the non-transitory image storage media configured to:
- store at least a portion of a first image obtained by a first image sensor functionally connected to the electronic device,
- store at least a portion of a second image obtained by a second image sensor functionally connected to the electronic device, and
- store the second image by synthesizing the second image into a location of the first image based upon a location of the second image sensor relative to a display and a side of the second image sensor relative to the display.

23. An electronic device, the electronic device comprising:
- an image sensor;
- a timer;
- a display unit disposed on the same side of the electronic device as the image sensor; and
- a control unit configured to:
  - control the image sensor to acquire an image,
  - drive the timer in response to a photographing request, and
  - control the display unit to display a sub screen image based on the acquired image, in a partial region of the display unit located on a same side of the electronic device as the image sensor and adjacent to the image sensor,
- wherein the sub screen image is displayed to be overlapped on a main screen image and displayed from a time when the timer starts until a time when the timer expires.

24. The electronic device of claim 23, wherein the controller is further configured to:
- detect a rotation of the electronic device, and
- control the display unit to display the sub screen image rotated according to the rotation of the electronic device,
- wherein a location of the displayed sub screen image is maintained regardless of the rotation of the electronic device.

25. A method for processing an image using an electronic device, the method comprising:
- acquiring the image via an image sensor disposed on a same side of the electronic device as a display of the electronic device;
- driving a timer in response to a photographing request; and
- displaying a sub screen image on the display based on the acquired image in a partial region of the display adjacent to the image sensor,
- displaying, on the display, the sub screen image overlapped on a main screen image and displayed from a time when the timer starts until a time when the timer expires,
- determining, using a controller of the electronic device, a location of the partial region based on a location of the image sensor.

26. The method of claim 25, further comprising:
- detecting a rotation of the electronic device, and
- displaying the sub screen image rotated according to the rotation of the electronic device,
- wherein a location of the displayed sub screen image is maintained regardless of the rotation of the electronic device.

* * * * *